(12) United States Patent
Liu et al.

(10) Patent No.: US 6,909,680 B2
(45) Date of Patent: Jun. 21, 2005

(54) STORAGE MEDIUM ADMINISTRATION APPARATUS

(75) Inventors: Tai-Sheng Liu, Chung Li (TW); Chi-An Wu, Taipei Hsien (TW)

(73) Assignee: Quanta Computer Inc., Taoyuan Hsien (TW)

(*) Notice: Subject to any disclaimer, the term of this patent is extended or adjusted under 35 U.S.C. 154(b) by 380 days.

(21) Appl. No.: 10/304,694

(22) Filed: Nov. 27, 2002

(65) Prior Publication Data

US 2004/0066713 A1 Apr. 8, 2004

(30) Foreign Application Priority Data

Oct. 4, 2002 (TW) ...................................... 91215827 U

(51) Int. Cl.$^7$ .............................................. G11B 7/00
(52) U.S. Cl. .................. 369/53.37; 369/30.38
(58) Field of Search .......................... 369/53.37, 30.32, 369/30.38

(56) References Cited

U.S. PATENT DOCUMENTS 5,631,882 A * 5/1997 Mascenik ................ 369/30.32

* cited by examiner

Primary Examiner—Nabil Hindi
(74) Attorney, Agent, or Firm—Rabin & Berdo, P.C.

(57) ABSTRACT

A storage medium administration apparatus is electrically connected to a computer. The storage medium administration apparatus has a plurality of child storage modules. The structure and function of the child storage modules are described as follows: a switch sends a message to a computer for modifying record status when it switches; a latch locks and unlocks the storage medium by a command from the computer; and a spring pushes the storage medium which is unlocked by the latch.

11 Claims, 2 Drawing Sheets

STORAGE MEDIUM ADMINISTRATION APPARATUS

BACKGROUND OF THE INVENTION

1. Field of Invention

The present invention relates to a storage medium administration apparatus. More particularly, the present invention relates to a storage medium apparatus controlled by administration means.

2. Description of Related Art

There are several types of digital storage media, such as Audio CD, Video CD (VCD), Digital Video Disk (DVD) on the market at present. Storage medium administration becomes a issue because of its enormous quantity. Conventionally, storage medium is put into the slot of storage apparatus without administration. Thus, searching the desired storage medium wastes time. Besides, the storage medium is easily lost because nobody knows who takes or returns the storage medium.

For example, in movie or film rental shop, storage media (such as Audio CD, Video CD, Digital Video Disk are available in large amounts. Searching for the desired storage medium still wastes time even though a computer is used to register all storage media rented out or returned. Besides, renting out and returning registration need to be executed manually. If someone forgets to perform registration when storage media are taken out or put in the slot of a storage apparatus, the record status in the computer is not identical to the real status in the slot of the storage apparatus.

For the forgoing reasons, there is a need to reduce searching time and administration problems of storage media because of the enormous quantity storage media.

SUMMARY OF THE INVENTION

It is therefore an objective of the present invention to provide a storage medium administration apparatus to control large amounts of storage media.

In accordance with the foregoing and other objectives of the present invention, a storage medium administration apparatus is electrically connected to a computer. The storage medium administration apparatus comprises a plurality of child storage modules. The structure and function of the child storage modules are described below. A switch sends a message to a computer for updating record status when it switches. A latch locks the storage medium, and unlocks the storage medium by a command from the computer; a spring pushes a storage medium which is unlocked by the latch.

The latch mentioned above locks the storage medium by a tensile force of a spring. The latch unlocks the storage medium while a muscle wire pulls the latch. The muscle wire shortens and generates a tensile force when it is heated using electric current.

In conclusion, the invention has advantages as follows:

1. The muscle wire, used in present invention, has a small volume and can be heated by electric current. In addition, the muscle wire operates quickly and accurately.

2. A switch is used rather than executing registration.

3. The present invention reduces the search time for the storage medium.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
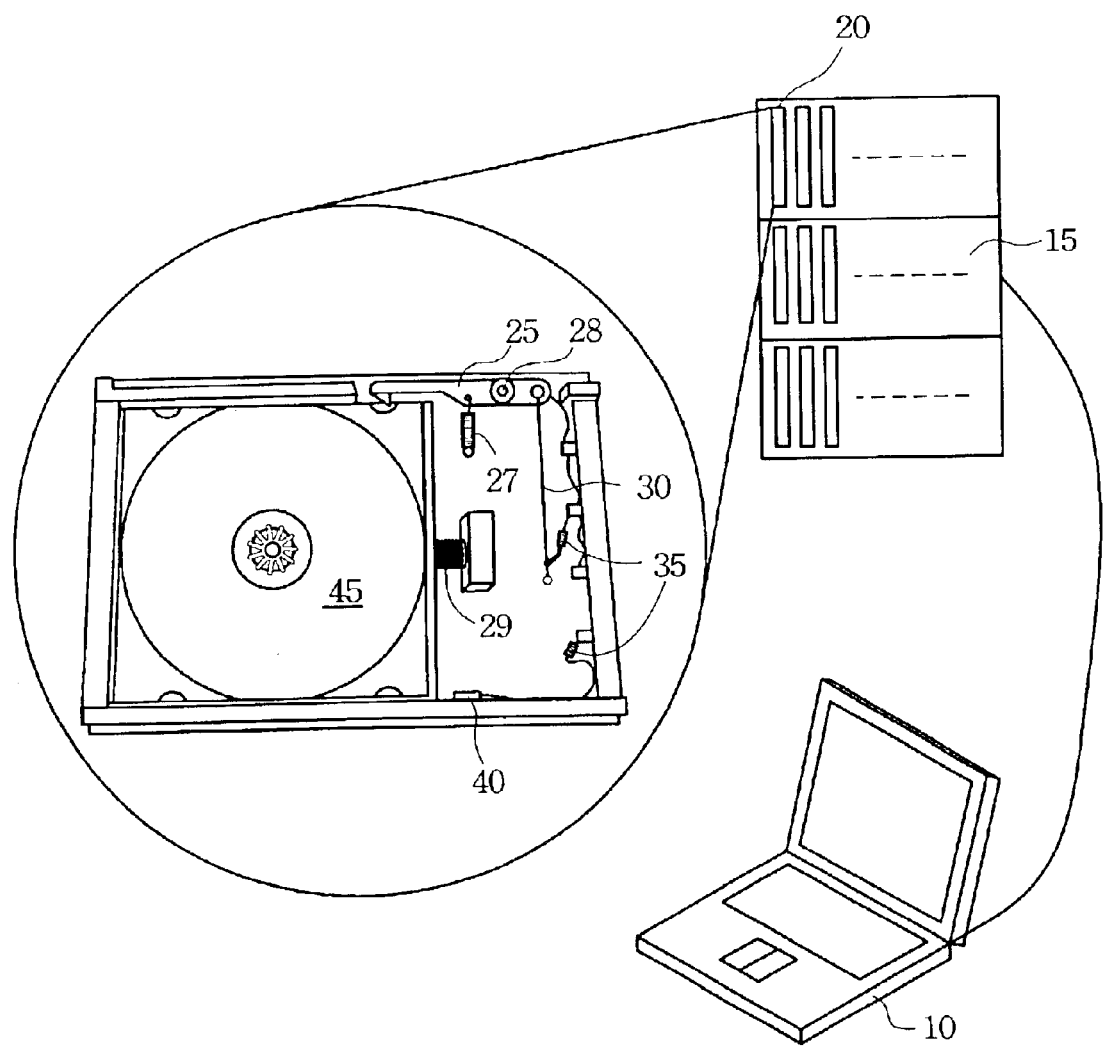
FIG. 1 illustrates a storage medium administration apparatus according to a preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In one preferred embodiment of the present invention, a storage medium administration apparatus, electrically connecting to a computer, can register storage media taken or returned automatically without manual searching for storage media.

FIG. 1 illustrates a storage medium administration apparatus according to a preferred embodiment of the present invention. The storage medium administration apparatus comprises a computer 10, a storage medium apparatus 15 and a plurality of child storage modules 20. The left side of FIG. 1 is enlarged detail of the child storage modules 20 in a top plane view. A latch 25, mounted in the child storage module 20, can hook the slot on a outer case of a storage medium 45 to prevent storage medium 45 from sliding out of the child storage module 20. The latch 25, connected to the child storage module 20 with a pivot 28, locks the storage medium 45 with a spring 27 creating a tensile force pulling the latch 25. A muscle wire 30 pulls the latch 25 against the spring 27 tensile force and unlocks the storage medium 45 when muscle wire 30 receives a release command from the computer 10.

Referring to FIG. 1, a switch 40 in the child storage modules 20 is used to sense and update the record status in the computer 10 when the switch 40 is turned on or off. For example, the storage medium 45 pushes down the switch 40 when the latch 25 locks the storage medium 45 in the child storage modules 20. The computer 10 then receives a signal from the switch 40 and indicates that there is a storage medium 45 in the child storage module 20. On the contrary, the storage medium 45 releases the switch 40 when the latch 25 unlocks the storage medium 45 and a spring 29 pushes the storage medium 45 out of the child storage module 20. The computer 10 then receives a signal from the switch 40 and indicates that there is nothing in the child storage module 20.

The muscle wire 30 mentioned above is a kind of metal alloy, and its physical feature is named Shape Memory Effect (SME). This type of muscle wire metal alloy has a unitary lattice structure which can vary at different temperatures. The muscle wire alloy can shape (extend or shorten) much more than other metals during transition temperature.

For example, the muscle wire alloy can extend under transition temperature and shorten if the muscle wire alloy is heated above transition temperature. In one preferred embodiment, the muscle wire 30 generates a force pulling the latch 25 to unlock the storage medium 45 when it shortens by heating. When the muscle wire 30 cools off (under transition temperature), it recovers its original length.

The muscle wire provides a pulling force which is several times heavier than its weight. It operates smoothly, quickly, and accurately. In addition, the muscle wire's volume size is small enough to fit in the child storage module 20. In one preferred embodiment, the muscle wire's temperature rises and pulls the latch 25 when electric current passes through the muscle wire.

Figure 2:
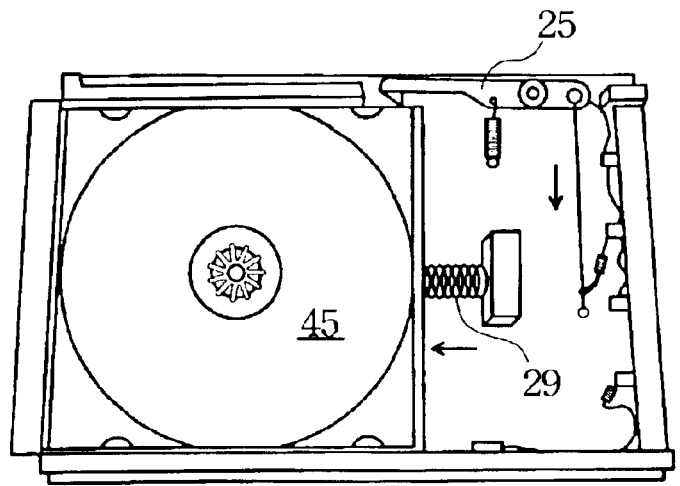
FIG. 2 illustrates a child storage module pushing out a storage medium according to one preferred embodiment of this invention.

The description below describes how the storage medium is administered in one preferred embodiment. (Referring to FIG. 1). When the desired storage medium 45 needs to be taken out of the storage medium apparatus 15, a push command for the desired storage medium 45 is delivered from the computer 10 to the child storage module 20. (Referring to FIG. 2). The muscle wire 30 heated by electric current shortens and pulls the latch 25. The storage medium 45 is pushed out of the child storage module 20 and releases the switch, updating the record status in the computer 10. Afterwards, the muscle wire 30 recovers its original length and the latch 25 returns to its original position when the temperature cools to below the transition temperature.

Figure 3:
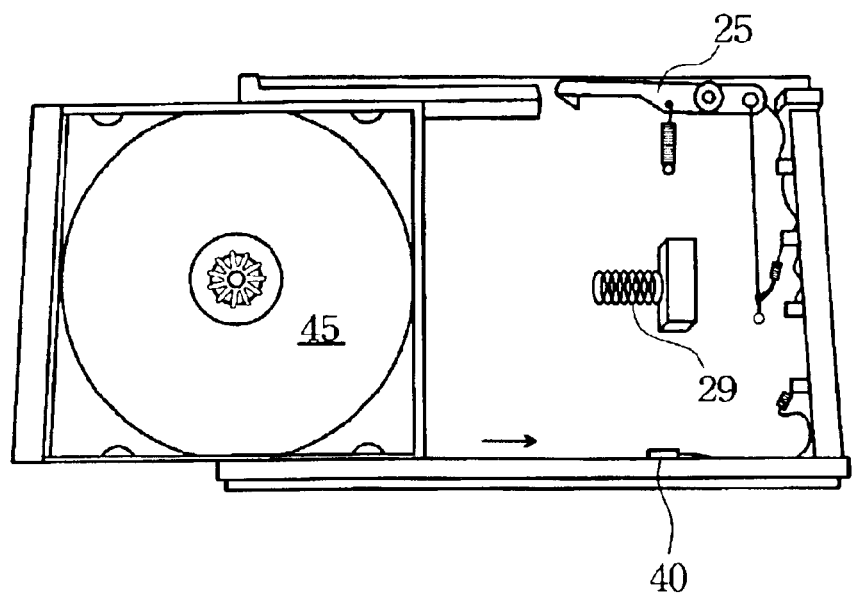
FIG. 3 illustrates a storage medium inserted into a child storage module according to one preferred embodiment of this invention.

In contrast, with reference to FIG. 3, when the desired storage medium 45 needs to be returned to the child storage module 20, the storage medium 45 is manually inserted into the child storage module 20 until the latch 25 hooks the slot on a outer case of a storage medium 45. Meanwhile, the switch 40 is pushed down by the storage medium 45 and the record status in the computer 10 is updated without extra registration.

In conclusion, the invention has advantages as follows:

1. The muscle wire, used in present invention, has a small volume and can be heated by an electric current. In addition, the muscle wire operates quickly and accurately.

2. The switch is used rather than executing registration.

3. The present invention reduces the search time for the storage medium.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A storage medium administration apparatus comprising a computer and a plurality of storage modules for storing a storage medium, wherein said computer is used to control said plurality of storage module, said storage module comprising:

a switch, mounted in said storage module, sending a message to said computer in order to update a record status of said storage module in said computer; and a latch, mounted in said storage module, wherein said latch locks said storage medium if said storage medium is inserted into said storage module and unlocks said storage medium if said computer sends a release command to said storage module to release said storage medium.

2. The storage medium administration apparatus of claim 1 further comprising a first spring, mounted in said storage module with one end, to push said storage medium.

3. The storage medium administration apparatus of claim 1 further comprising a second spring, connecting said latch and said storage module, said latch locking said storage medium with a tensile force of said second spring.

4. The storage medium administration apparatus of claim 1, wherein said latch includes a muscle wire, said latch unlocking said storage medium uses said muscle wire when receiving said push command.

5. The storage medium administration apparatus of claim 4, wherein said muscle wire shortens and generates a tensile force when heated by electric current.

6. A storage medium administration apparatus comprising a computer and a plurality of storage modules, wherein said computer is used to control said plurality of storage module and said storage module stores a storage medium, said storage module comprising:

a switch sending a message to said computer in order to update record status of said storage module in said computer; and a latch with a muscle wire, locking or unlocking said storage medium by heating said muscle wire using electric current.

7. The storage medium administration apparatus of claim 6, wherein said latch locking storage medium uses a tensile force of a spring.

8. The storage medium administration apparatus of claim 6, wherein said latch unlocking said storage medium uses said muscle wire when receiving said push command.

9. The storage medium administration apparatus of claim 8, wherein said muscle wire shortens and generates a tensile force when heated by electric current.

10. A storage medium administration apparatus comprising:

a storage module for storing a storage medium, said storage module controlled by a computer;

a switch, mounted in said storage module, sending a message to said computer in order to update a record status of said storage module in said computer; and a latch, mounted in said storage module, wherein said latch locks said storage medium if said storage medium is inserted into said storage module and unlocks said storage medium if said computer sends a push command to said storage module, said latch uses a muscle wire for locking or unlocking said storage medium.

11. The storage medium administration apparatus of claim 10, wherein said muscle wire shortens and generates a tensile force for said latch when heated by electric current.

* * * * *